United States Patent [19]

Couse et al.

[11] Patent Number: 4,920,462
[45] Date of Patent: Apr. 24, 1990

[54] DISC DRIVE FINE SERVO VELOCITY CONTROL AND METHOD FOR HEAD POSITIONING RELATIVE TO A DISC

[75] Inventors: Robert F. Couse, Saratoga; Patrick G. Mercer, Santa Clara, both of Calif.

[73] Assignee: Syquest Technology, Fremont, Calif.

[21] Appl. No.: 164,881

[22] Filed: Mar. 7, 1988

[51] Int. Cl.$^5$ .................... G11B 5/55; G11B 21/08; G11B 21/10
[52] U.S. Cl. .................... 360/78.04; 360/77.08; 360/78.14; 369/32
[58] Field of Search ............. 360/75, 49, 77.01–77.08, 360/77.11, 77.12, 78.01, 78.02, 78.04–78.09, 78.11–78.15; 369/32, 33, 41, 43, 44; 318/561, 571, 592; 358/907

[56] References Cited

U.S. PATENT DOCUMENTS

| Re. 32,075 | 1/1986 | Harrison et al. | 360/77 |
|---|---|---|---|
| 3,994,016 | 11/1976 | Moghadam | 360/77.02 |
| 4,103,314 | 7/1978 | Case | 360/78.06 |
| 4,135,217 | 1/1979 | Jacques et al. | 360/77.04 |
| 4,480,279 | 10/1984 | Hashimoto | 360/78.07 |
| 4,488,187 | 12/1984 | Alaimo | 360/77 |
| 4,630,190 | 12/1986 | Alaimo et al. | 360/77 |
| 4,679,103 | 7/1987 | Workman | 360/78.14 |
| 4,701,898 | 10/1987 | Giddings | 369/32 |

OTHER PUBLICATIONS

IEEE Transactions on Magnetics, vol. Mag-14, No. 4, McKnight, Jul. 1978, pp. 182–184.

Primary Examiner—Vincent P. Canney
Assistant Examiner—Steven R. Garland
Attorney, Agent, or Firm—Fliesler, Dubb, Meyer & Lovejoy

[57] ABSTRACT

A disc drive 22 having a head 26 actuated by an actuator 32 for seeking out a destination track 30 includes servo velocity control circuitry 51 and servo position control circuitry 41. The servo velocity control circuitry 51 seeks out the destination track and places the head within the boundaries of that track while the servo position control circuitry 41 using servo information places the head on the centerline of the destination track. The fine servo control circuitry 20 is provided for communicating the information generated by the servo position control circuitry 41 to the servo velocity circuitry 51 when the head 26 is several tracks from the destination track in order to allow the actuator 32 to smoothly and quickly cause the head to seek within the boundaries of the destination track without overshooting that track.

16 Claims, 2 Drawing Sheets

| PREAMBLE | ID | SYNC | INDX | TRACK NUMBER | SERVO |
|---|---|---|---|---|---|
| 48 BITS | 10 BITS | 2 BITS | 2 BITS | 22 BITS | 24 BITS |

FIG.-2

DISC DRIVE FINE SERVO VELOCITY CONTROL AND METHOD FOR HEAD POSITIONING RELATIVE TO A DISC

FIELD OF THE INVENTION

The present invention relates to apparatus and method for positioning a read/write head relative to media in order to allow the head to write data to or read data from the media. The fine servo velocity control can be used with rigid or floppy disc drives and with fixed or removable media.

BACKGROUND ART

Presently available on the market are a wide variety of data storage devices including for example Winchester hard disc drives, floppy disc drives and others. With these devices data can be stored by using both magnetic and optical techniques. These devices include appropriate circuitry for allowing for the accurate placement of a read/write head relative to one of a plurality of data tracks which are formatted on, for example, a rigid or floppy disc. In these prior devices, the circuitry for seeking the appropriate track is divided into several seek functions. The first seek function is that of a servo velocity control whereby servo velocity control circuitry causes the head to seek to the destination track and then settles between the boundaries of that track. The second seek function is that of a servo position control whereby the servo position control circuitry causes the head to follow the centerline of the destination track. As servo velocity control circuitry, prior art devices use glass scales, encoders, and other devices for counting tracks so that from a departure track, a calculation can be made to determine how far the head must traverse until a destination track is reached, and for monitoring the progress of the head towards the destination track. Additionally, one or more servo sectors can be provided on each track which includes the number of the track so that the head can read a track number and know which track it is over and thus its position.

The servo position control circuitry is used to read servo patterns or bursts which are located in the servo sectors of the tracks. By reading these bursts and taking the difference of the signals from the bursts, the servo circuitry can determine whether the head is on the centerline or to the right or left of the centerline of a track and make appropriate adjustments. Discussion of the servo position control circuitry can be obtained from a review of U.S. Pat. No. 4,488,187 and 4,630,190 which are assigned to the present Assignee, SyQuest Technology and which are incorporated herein by reference.

Further in some prior art devices as a destination track is approached, the servo velocity control circuitry hands off control of the seek function to the servo position control circuitry. Such a switch to the servo position control circuitry can at times result in the head overshooting the destination track.

In prior art devices, when the head overshoots the destination track, such devices are generally not capable of seeking back to the destination track using the servo position control circuitry, but must revert to servo velocity control circuitry again and then back to the servo position control circuitry in order to settle on the destination track. Quite naturally this can increase the access time to an unacceptable level.

While the above devices perform successfully, as the need arises to store more data in a smaller area, and as computers become more powerful and faster, resulting in the need for faster data access times, there is a need to increase both the speed and the accuracy of the heads for seeking out the centerline of a track.

SUMMARY OF THE INVENTION

The present invention is directed to addressing the need for a rapid, accurate and smooth seek function so that the access time is reduced. Further the invention allows for a higher track density (tracks per inch, TPI) as the invention allows the servo system to cause the head to more accurately seek and settle on the centerline of the destination track.

The invention includes a disc drive capable of mounting a disc which disc defines a plurality of tracks. Additionally the drive includes a read/write head for transferring data to and from the disc. The invention comprises a fine servo velocity control having servo velocity control circuitry for seeking to a destination track and for placing the head approximately on the destination track. It further includes servo position control circuitry for locating a centerline of a destination track and for placing the head on the centerline. Further circuitry is provided for selectively providing servo information generated by the servo position control circuitry to the servo velocity control circuitry as the head approaches the destination track to enable the head to quickly and smoothly settle on the centerline of the destination track.

The servo velocity control circuitry is designed to have an accuracy of approximately half the width of a track, while the servo position control circuitry can be infinitely variable with corresponding accuracy. The servo velocity control circuitry causes the head to traverse at a higher rate than the servo position control circuitry; however the servo position control circuitry allows the head to settle more smoothly and accurately on a centerline. Thus it is advantageous to merge these two functions and not simply allow the servo velocity control circuitry to hand off the seek function to the servo position control circuitry as this could cause the head to overshoot the destination track as can occur in prior art devices.

In the present invention as the head is approaching the destination track, servo position control information from the tracks immediately adjacent the destination track is used to adjust the velocity and acceleration of the head such that the head is moved to the destination track in a smooth and accurate manner within a preferred embodiment the head reaching the destination track with zero velocity.

In an aspect of the invention, the servo velocity control circuitry includes a device for determining when the head is at a preselected distance from a destination track and for enabling the servo position control circuitry to communicate with the servo velocity control circuitry when the servo velocity control circuitry determines that the head is at said prescribed distance.

In another aspect of the invention, the servo velocity control circuitry includes digital circuitry for receiving servo information stored on the disc, and the servo position control circuitry includes analog circuitry for receiving servo information stored on the disc. The fine servo velocity control for selectively providing servo information from the servo position control circuitry to the servo velocity control circuitry includes an analog to digital converter for communicating the servo information from the analog circuitry of the servo position control circuitry to the digital circuitry of the servo velocity control circuitry.

In still another aspect of the invention, the servo velocity control circuitry reads representations of the track numbers which are stored in servo data patterns.

In yet another aspect of the invention, a device is provided for disabling the ability of the servo velocity control to drive the head to a destination track should the servo velocity control malfunction. This device thus allows the head to float and prevents unwanted head acceleration or deceleration which could result in damage to the head or to the disc.

Accordingly it is an object of the present invention to provide for the rapid, accurate and smooth seeking of a destination track by a head in order to minimize track access time.

It is yet another aspect of the present invention to provide a disc drive with servo velocity control circuitry and servo position control circuitry for use in seeking a destination track and then settling on the centerline of the destination track.

It is still another aspect of the invention to provide a device for communicating servo information obtained by the servo position control circuitry to the servo velocity control circuitry at a predetermined distance from the destination track in order to more smoothly and accurately position the head relative to the track.

BRIEF DESCRIPTION OF THE FIGURES

FIG. 2 depicts a servo data pattern of the invention.

DETAILED DESCRIPTION OF THE PREFERRED EMBODIMENT

Figure 1:
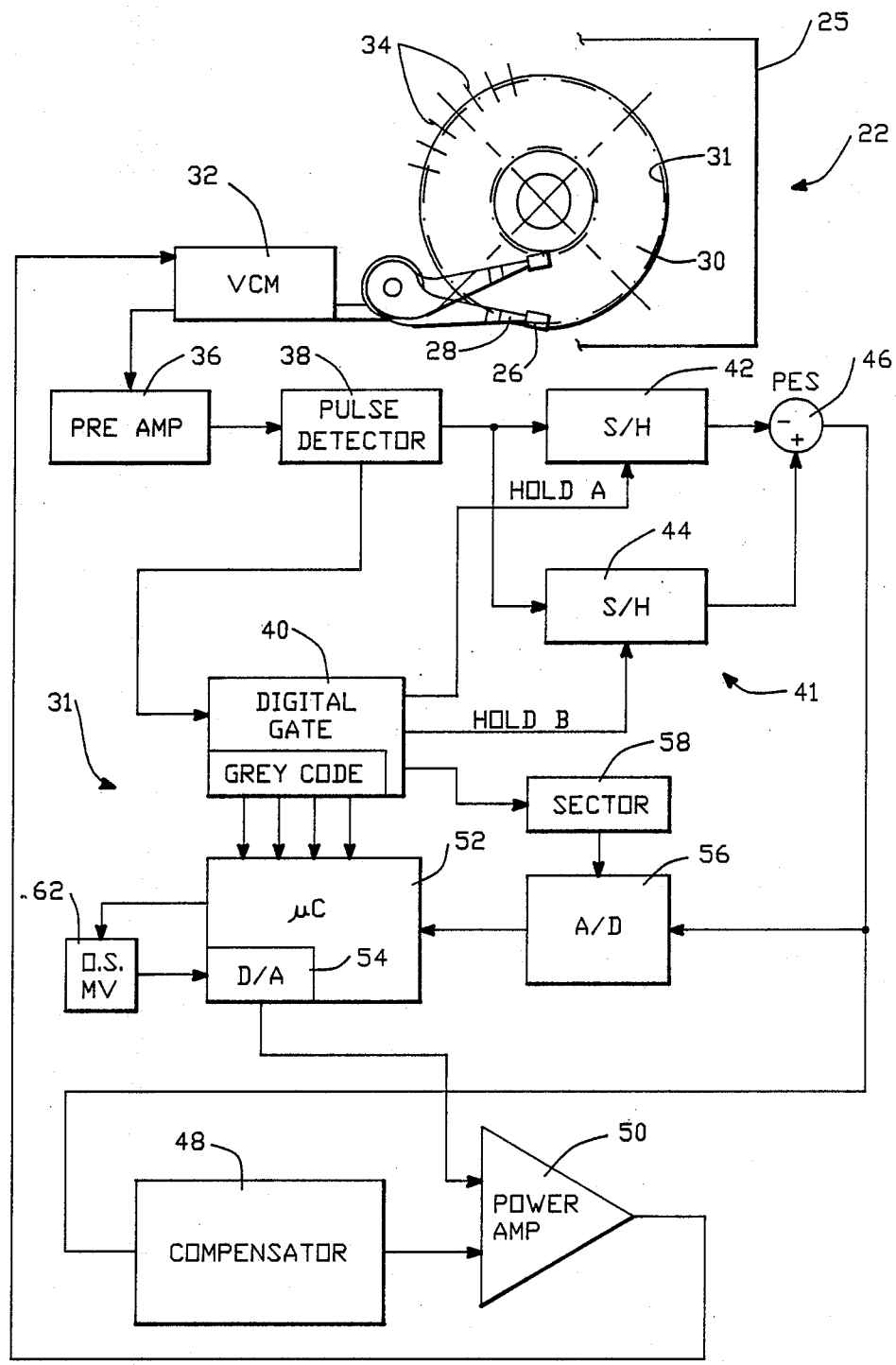
FIG. 1 depicts a schematic of an embodiment of the invention.

With reference to the figures and in particular to FIG. 1, a schematical representation of an embodiment of the fine servo velocity control of the invention is depicted and given the number 20. The fine servo velocity control 20 is for use in for example a Winchester disc drive such as drive 22 having a hard disc. The disc can be fixed in the disc drive 22 or can be secured in a cartridge 25 which is removably insertable into the drive 22. It is to be understood that the disc can store data and information using magnetic, optical and other means and still be used with the fine velocity control 20 of the invention. Further it is to be understood that the disc could also be of the floppy disc variety and be used with the present invention.

The disc drive 22 further includes at least one read/write head 26 supported by arm 28 relative to the disc. The head 26 and arm 28 are transported relative to the disc, and the data tracks 30, by an actuator 32 which in this embodiment is a voice coil motor. In the preferred embodiment, each surface of the disc is provided with approximately 1,283 concentric data tracks. Each data track, again in a preferred embodiment, includes 70, approximately equally and circumferentially spaced, servo data patterns such as servo data pattern 34 in FIGS. 1 and 2. These servo data patterns as will be explained hereinbelow provide servo data for the fine servo velocity control in order to cause the head to accurately, rapidly and smoothly seek to the destination track. On each track 30, between any two servo data patterns 34, is provided a user data field that can store user generated data and information.

The servo data pattern as can be seen in FIG. 2 has a servo sector of bits including a block of preamble bits and ID bits which serves to identify and distinguish the servo sector from the user data which is located between the servo sectors. The servo data format further includes SYNC, and INDEX bits. Following those bits are track number bits which are provided in Grey code, with each track assigned a different and in a preferred embodiment, a sequential number from the outermost track to the innermost track. Finally the servo data pattern includes a servo section which includes information for allowing the head to be aligned on the centerline of each track. In a preferred embodiment this includes what are known in the industry as "A" and "B" bursts which are read by the head. These bursts are sampled as explained below and the difference between the sampled signals is taken in order to provide an offset signal, also known as a position error signal (PES), so that the head can be moved towards the centerline of the track.

As can be seen in FIG. 1, the fine servo velocity control 20 further includes a preamplifier 36 and a pulse detector 38. The pulse detector 38 amplifies the signal from the head 26, filters this signal and creates a digital signal which has a leading edge which is coincident with the peak of each analog signal coming from the head representing the above bursts. Digital servo data from the pulse detector 38 including the track number is communicated to the digital gate array 40.

Servo velocity control is accomplished with the servo velocity control circuitry 31 by providing the Grey code which specifies the track number from the digital gate 40 to a microcomputer or microprocessor 52. As the power amplifier 50 is an analog device the microcomputer 52 includes an D/A converter 54 which converts the digital signal generated by the microcomputer 52 to an analog signal for communicating to the power amplifier 50. This Grey code enables the microcomputer 52 to know where the head is relative to the tracks, to the accuracy of approximately one half of the width of a track. The microcomputer 52 then generates a seek command, causing the power amplifier 50 to provide a seek signal to actuator 32, causing head 26 to seek to the destination track.

Servo position control circuitry 41 of this embodiment includes the following. Signals from digital gate array 40 are used to enable sample and hold circuits 42 and 44, which themselves communicate with the pulse detector 38, in order to sample and hold the amplitude of the signals from the "A" and "B" bursts at the appropriate times. The difference of these two signals is determined at the summing point 46 and communicated to a compensation circuit 48, which provides the appropriate filtering of the position error signal, and then to power amplifier 50. Power amplifier 50 drives the voice coil motor 32. As the position error signal indicates how far the head is from the centerline 31 of the track, the input from the compensation circuit to the power amplifier 50 provides for the servo position control to adjust the head position and to keep the head aligned with the centerline of the destination track. The fine servo control 20 further includes an A/D converter 56 which communicates the position error signal from summing point 46 to the microcomputer 52 by converting the analog position error signal to a digital signal. The A/D converter 56 is enabled through the digital gate 40 by an appropriate sector pulse 58 so that the A/D converter 56 is enabled when a valid offset or position error signal is available from the summing point 46. When head 26 is a preselected distance from the destination track, such as for example one or two tracks away, as determined by the microcomputer 52 reading the Grey code, the microprocessor 52 causes digital gate 40 to send the sector pulse 58 to the A/D converter 56.

In effect then a servo position control signal is provided to the microcomputer 52 in order to modify the servo velocity control signal sent to the power amplifier by the microcomputer 52 when the head is several tracks away from the destination track. The accuracy of the fine servo position control circuit 20 is about 1/100 of a track width.

Another aspect of the invention includes a watchdog timer which is comprised of a one-shot multivibrator 62. In a preferred embodiment the one-shot multivibrator 62 receives a pulse from the microcomputer 52 once every millisecond. Other pulse rates are within the scope of the invention. The one-shot multivibrator 62 then provides an enable signal to the digital to analog converter 54. If for any reason the microcomputer 52 does not work properly or does not receive a sector pulse 58 and does not provide a pulse signal to the one-shot multivibrator 62, then no enable signal is provided to the digital to analog converter 54 and the value of the output of the D/A converter 54 goes to zero resulting in the power amplifier 50 turning off the current to the actuator 32. This allows the actuator 32 to coast so that the actuator, the head and the disc are not damaged by for example the actuator slamming into an actuator crash stop at an elevated velocity.

INDUSTRIAL APPLICABILITY

While the present invention is described with respect to a disc drive, it is to be understood that the present invention can be included in any device having a seek function whether it is a data storage device or not.

From the above it can be seen that the present invention allows for a smooth and accurate seek function. This is accomplished by using servo position control information to modify the actions of the servo velocity control circuitry. In prior art devices, the velocity control circuitry simply hands off to the position control circuitry. This being the case, it is often possible for the servo velocity control circuitry to cause the head to overshoot the destination track as the servo velocity control circuitry is handing off to the servo position control circuitry. If the track is overshot, then the servo system must switch back to the servo velocity control circuitry in order to reposition the head on the destination track. This procedure quite naturally increases the access time. In the present invention, when the head is several tracks away from the destination track, the servo position control circuitry provides highly accurate head position information to the servo velocity control circuitry so that the position of the head is more accurately known. Thus the head can be actuated to a position within the boundaries of the destination track without overshooting the destination track. After this has occured, the servo velocity control circuitry hands off control of head positioning to the servo position control circuitry, and the head in a preferred embodiment is placed on the track with zero velocity.

Other aspects and advantages of the invention can be ascertained from a review of the claims and the figures.

It is to be understood that while the invention was disclosed herein with respect to one specific embodiment, that other embodiments can come within the scope and breadth of the invention as claimed.

We claim:

1. A fine servo velocity control for a disc drive capable of mounting a disc, defining a plurality of data tracks and having a read/write head for transferring data to and from the disc, the fine servo velocity control comprising:
   servo velocity control means for seeking to a destination data track and for placing the head approximately on a destination data track;
   servo position control means for locating a centerline of a destination data track and for placing the head about on the centerline of the destination track;
   fine servo velocity control means for selectively providing servo information generated by the servo position control means to the servo velocity control means, to assist in track seeking, as said servo velocity control means causes the head to approach and reach the destination data track to enable the head to more quickly and smoothly settle on the destination track; and
   means for enabling said fine servo velocity control means to provide servo information to the servo velocity control means when said servo velocity control means determines the head is a preselected distance from a destination data track.

2. The apparatus of claim 1 wherein:
   said servo velocity control means includes digital circuitry means for receiving servo information stored on the disc;
   said servo position control means includes analog circuity means for receiving servo information stored on the disc; and
   said fine servo velocity control means includes an analog to digital conversion means for communicating the servo information received by the analog circuitry means to the digital circuitry means.

3. The apparatus of claim 1 including:
   servo information stored in servo data patterns on tracks of the disc;
   said servo information including a representation of the number assigned to each track and centerline centering information;
   said servo velocity control means including means for receiving the representation of the number assigned to each track; and
   said servo position control means including means for receiving the centerline centering information.

4. The apparatus of claim 1 wherein:
   said servo position control means includes:
   (a) sample and hold means for sampling and holding track centerline centering servo information;
   (b) means for generating a position error signal from the centerline centering servo information sampled by the sample and hold means; and
   said fine servo velocity control means includes means for communicating said position error signal to said servo velocity control means.

5. A fine servo velocity control for a disc drive capable of mounting a disc, defining a plurality of data tracks and having a read/write head for transferring data to and from the disc, the fine servo velocity control comprising:
   servo velocity control means for seeking to a destination track and for placing the head approximately on a destination track;

servo position control means for locating a centerline of a destination track and for placing the head about on the centerline of the destination track;

fine servo velocity control means for selectively providing servo information generated by the servo position control means to the servo velocity control means to assist in track seeking, as said servo velocity control means, causes the head to approach the destination track to enable the head to more quickly and smoothly settle on the destination track;

means for disabling the servo velocity control means should the servo velocity control means malfunction;

wherein said velocity control means includes a microprocessor means adapted for sending a seek signal; and wherein said disabling means including a means for receiving a pulse from the microprocessor and means for disabling the seek signal should the microprocessor not send said pulse to said disabling means.

6. The apparatus of claim 5 wherein:
said disabling means includes a one-shot multivibrator.

7. A fine servo velocity control for a disc drive capable of mounting a disc, defining a plurality of data tracks, and having a read/write head for transferring data to and from the disc, the fine servo velocity control comprising:

servo velocity control means for seeking to a destination track and for placing the head approximately on a destination track;

servo position control means for locating a centerline of a destination track and for placing the head about on the centerline of the destination track;

servo information stored in servo data patterns on tracks of the disc;

said servo information including a representation of the number assigned to each track and centerline centering information;

said servo velocity control means including means for receiving the representation of the number assigned to each track, to assist in track seeking; and said servo position control means including means for receiving the centerline centering information;

fine velocity control means for selectively providing servo information generated by the servo position control means to the servo velocity control means, to assist in track seeking, as said servo velocity control means causes the head to approach the destination track to enable the head to more quickly and smoothly settle on the destination track; and wherein said servo velocity control means includes means for determining when the head is a preselected distance from a destination track and for enabling said fine velocity control means when said servo velocity control means determines the head is a preselected distance from a destination track.

8. The apparatus of claim 7 wherein:
said servo velocity control means includes digital circuitry means for receiving servo information stored on the disc;
said servo position control means includes analog circuitry means for receiving servo information stored on the disc; and said fine velocity control means includes an analog to digital conversion means for communicating the servo information received by the analog circuitry means to the digital circuitry means.

9. The apparatus of claim 7 wherein:
said servo position control means includes:
 (a) sample and hold means for sampling and holding track centerline centering servo information;
 (b) means for generating a position error signal from the centerline centering servo information sampled by the sample and hold means; and
said fine velocity control means includes means for communicating said position error signal to said servo velocity control means.

10. A method for causing a data transfer head to seek and settle onto a destination data track in a quick and smooth manner including the steps of:
providing a servo velocity control for seeking to a destination data track;
providing a servo position control for locating a centerline of a destination data track and for centering the head about on the centerline;
providing a fine servo velocity control for the communication of centerline centering information from the servo position control to the servo velocity control, to assist in track seeking, as the destination data track is approached and reached by the head, beginning when the servo velocity control determines the head is a preselected distance from the destination data track.

11. The method of claim 10 wherein said step of providing for the communication of centerline centering information includes:
providing the centerline centering information to the servo velocity control a preselected number of tracks before the head reaches the destination track.

12. The method of claim 10 including the step of:
providing for the disablement of the servo velocity control should the servo velocity control malfunction.

13. A disc drive adapted for receiving a disc which defines a plurality of data tracks comprising:
means adapted for mounting a disc;
a read/write head means for transferring data to and from the disc; and
a fine servo velocity control comprising:
 (a) servo velocity control means for seeking to a destination data track and for placing the head approximately on a destination data track;
 (b) servo position control means for locating a centerline of a destination data track and for placing the head about on the centerline of the destination data track;
 (c) fine servo velocity control means for selectively providing servo information generated by the servo position control means to the servo velocity control means, to assist in track seeking, as said servo velocity control means causes the head to approach and reach the destination data track to enable the head to more quickly and smoothly settle on the destination data track;
 (d) means for enabling said fine servo velocity control means to provide servo information to the servo velocity control means when said servo velocity control means determines the head is a preselected distance from a destination track.

14. A fine servo velocity control for a disc drive capable of mounting a disc, defining a plurality of data tracks, and having a read/write head for transferring data to and from the disc, the fine servo velocity control comprising:

servo velocity control means for seeking to a destination track and for placing the head approximately on a destination track;

servo position control means for locating a centerline of a destination track and for placing the head about on the centerline of the destination track;

servo information stored in servo data patterns on tracks of the disc;

said servo information including a representation of the number assigned to each track and centerline centering information;

said servo velocity control means including means for receiving the representation of the number assigned to each track;

said servo position control means including means for receiving the centerline centering information; and fine velocity control means for selectively providing servo information generated by the servo position control means to the servo velocity control means, to assist in track seeking, as said servo velocity control means causes the head to approach the destination track to enable the head to more quickly and smoothly settle on the destination track.

15. A method for causing a data transfer head to seek and settle onto a destination data track in a quick and smooth manner including the steps of:

providing a servo velocity control for seeking to a destination track;

providing a servo position control for locating a centerline of a destination track and for centering the head about on the centerline;

providing servo information stored in servo data patterns on tracks of the disc, which servo information including a representation of the number assigned to each track and centerline centering information;

causing the servo velocity control to receive the representation of the number assigned to each track;

causing the servo position control to receive the centerline centering information; and providing a fine servo velocity control for the communication of centerline centering information from the servo position control to the servo velocity control, to assist in track seeking, as the destination track is approached and reached by the head.

16. A disc drive adapted for receiving a disc which defines a plurality of data tracks and which has servo information stored in servo data patterns on the data tracks of the disc, the servo information including a representation of the number assigned to each track and centerline centering information, comprising:

means adapted for mounting a disc;

a read/write head means for transferring data to and from the disc; and a fine servo velocity control comprising:
(a) servo velocity control means for seeking to a destination track and for placing the head approximately on a destination track;
(b) servo position control means for locating a centerline of a destination track and for placing the head about on the centerline of the destination track;
(c) said servo velocity control means including means for receiving the representation of the number assigned to each track;
(d) said servo position control means including means for receiving the centerline centering information; and
(e) fine servo velocity control means for selectively providing servo information generated by the servo position control means to the servo velocity control means, to assist in track seeking, as said servo velocity control means causes the head to approach the destination track to enable the head to more quickly and smoothly settle on the destination track.

* * * * *